United States Patent
Vergnano

(10) Patent No.: US 8,113,777 B2
(45) Date of Patent: Feb. 14, 2012

(54) ULTRALIGHT AIRFOILS FOR WIND ENERGY CONVERSION

(75) Inventor: Gianni Vergnano, Castelnuovo Don Bosco (IT)

(73) Assignee: Sequoia It S.R.L., Chieri (TO) (IT)

( * ) Notice: Subject to any disclaimer, the term of this patent is extended or adjusted under 35 U.S.C. 154(b) by 1082 days.

(21) Appl. No.: 11/994,090

(22) PCT Filed: Jun. 23, 2006

(86) PCT No.: PCT/IT2006/000481
§ 371 (c)(1),
(2), (4) Date: Dec. 27, 2007

(87) PCT Pub. No.: WO2007/000788
PCT Pub. Date: Jan. 4, 2007

(65) Prior Publication Data
US 2008/0185480 A1    Aug. 7, 2008

(30) Foreign Application Priority Data
Jun. 27, 2005   (IT) .............................. TO2005A0444

(51) Int. Cl.
*F03D 7/02* (2006.01)
*F01D 1/24* (2006.01)

(52) U.S. Cl. ....... 416/41; 416/128; 416/132 B; 416/136; 416/197 A; 416/240

(58) Field of Classification Search .............. 416/41, 416/84, 117, 122, 132 R, 132 B, 134 R, 135, 416/136, 197 A, 197 R, 240, 128; 290/43, 290/44, 53, 54, 55
See application file for complete search history.

(56) References Cited

U.S. PATENT DOCUMENTS

| 704,507 | A | | 7/1902 | Bruneau | |
|---|---|---|---|---|---|
| 802,144 | A | | 10/1905 | Harrington | |
| 2,633,921 | A | * | 4/1953 | Monney | ..................... 416/132 R |
| 4,124,182 | A | * | 11/1978 | Loeb | .............................. 416/84 |
| 4,191,507 | A | * | 3/1980 | DeBerg | ........................ 416/117 |
| 4,207,026 | A | * | 6/1980 | Kushto | ............................. 416/84 |
| 4,276,033 | A | * | 6/1981 | Krovina | ................... 416/132 B |
| 4,832,571 | A | | 5/1989 | Carrol | |
| 5,040,948 | A | | 8/1991 | Harburg | |
| 6,254,034 | B1 | | 7/2001 | Carpenter | |
| 6,327,994 | B1 | | 12/2001 | Labrador | |
| 6,402,472 | B1 | * | 6/2002 | Hogue et al. | .............. 416/132 A |
| 6,555,931 | B2 | * | 4/2003 | Mizzi | ............................... 290/54 |
| 2002/0040948 | A1 | | 4/2002 | Ragner | |
| 2002/0192068 | A1 | | 12/2002 | Selsam | |
| 2005/0046197 | A1 | * | 3/2005 | Kingsley | ......................... 290/55 |

FOREIGN PATENT DOCUMENTS

| DE | 31 00 085 A1 | 12/1982 |
|---|---|---|
| DE | 31 26 692 A1 | 2/1983 |
| DE | 32 09 368 A1 | 9/1983 |
| DE | 102 52 759 A1 | 6/2004 |
| WO | WO 00/40860 | 7/2000 |

* cited by examiner

*Primary Examiner* — Igor Kershteyn
(74) *Attorney, Agent, or Firm* — Stephen Bongini; Fleit Gibbons Gutman Bongini & Bianco PL

(57) ABSTRACT

A device is described for generating energy. The device includes at least two ultralight airfoils rotating along their own axis, which functionally reproduce the characteristics of a propeller. The ultralight airfoils which characterize such aerodynamic configuration use pulling members (such as cables or tie-rods) to keep their shape when operating. An important weight reduction of the structure is thus obtained, which allows different applications in the aeolian generation field.

24 Claims, 5 Drawing Sheets

NO WIND

ULTRALIGHT AIRFOILS FOR WIND ENERGY CONVERSION

BACKGROUND OF THE INVENTION

1. Field of the Invention

The present invention relates to ultralight airfoils, rotating along their own axis, for generating energy.

2. Background Information

Kites, or semi-rigid wings, can be defined as aerodynamic structures which, to keep their shape during their use, need tie-rods (similar for example to those on a suspended bridge). Kites or semi-rigid wings have been used so far essentially for sports objectives, so as to exploit only a small part of the potential of these new aerodynamic structures.

In the first steps in the history of flight, it was frequent to see the use of aerodynamic structures reinforced by the use of tie-rods.

The improvement of material characteristics and the increases in speed in time have removed the use of such technology.

The use of tie-rods for reinforcing structures which are not rigid enough appears again with the Francis Rogallo wing in 1948 and with the following development of kites and ultralight planes.

However, strangely, the use of tie-rods, usually applied for lightening and making it possible to build, for example, big sized bridges, has never been extended to the manufacturing of propellers, when from the propulsion type they were transformed into wind energy catching propellers.

The continuing use of traditional propellers in the aeolian sector in practice has prevented the development of aeolian generation techniques at a height, being that the propellers weight is an almost impossible constraint to overcome, as the prior arrangements demonstrate since they can operate only when there are very strong winds.

SUMMARY OF THE INVENTION

An object of the present invention is integrating the solutions applied in manufacturing kites or semi-rigid wings, also to the manufacture of more complex structures using as components many kites or the semi-rigid ultralight airfoils, making them rotate along their own axis, so as to realize an aerodynamic structure which emulates the performance of a propeller. The airfoils of the invention thus provide a contribution for the development of a simple, economic and ecologic energy generating technology.

The above and other objects and advantages of the invention, as will appear from the following description, are obtained with ultralight rotating airfoils applied to a device for generating energy as claimed in claim 1. Preferred embodiments and non-trivial variations of the present invention are the subject matter of the dependent claims.

In the following description, the term "helikite" will designate the figure composed of two or more kite or semi-rigid wings, made to rotate along their own axis, while the term "kite" will designate the airfoils which compose it, as can be seen in FIG. 1.

BRIEF DESCRIPTION OF THE DRAWINGS

The present invention will be better described by some preferred embodiments thereof, provided as a non-limiting example, with reference to the enclosed drawings, in which.

DESCRIPTION OF PREFERRED EMBODIMENTS OF THE INVENTION

Figure 1:
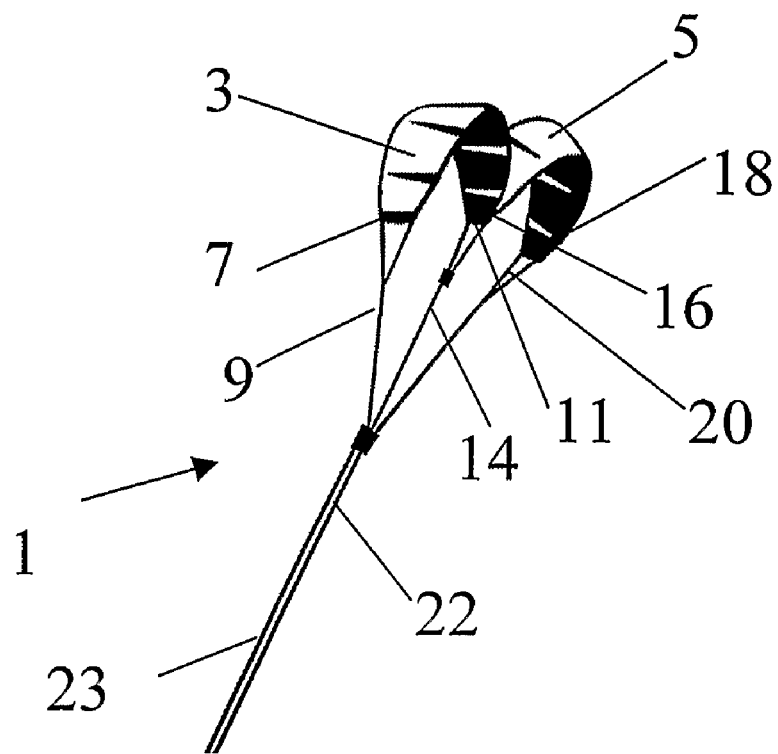
FIG. 1 shows kites or semi-rigid wings made rotate along their own axis.

There are several applications of this type of technology, the most immediate and important ones are those aimed to aeolian generation.

With the helikite (or device 1) it is possible, for example, to emulate the function of windmill propellers and, given the lightness of these systems, it is also possible to generate electrical energy at great heights, exploiting the winds present thereat.

The invention is related to a device (helikite) 1 for generating energy, whose major characteristic is that it is composed of at least two ultralight airfoils 3, 5 mutually connected at one end thereof and adapted to rotate around their own axis through a force applied by wind.

In particular, a first one 3 of such airfoils 3, 5 is connected at one end 7 thereof to first pulling means 9 and at another end 11 thereof to second pulling means 14, a second one 5 of such airfoils 3, 5 is connected at one end 16 thereof to second pulling means 14 and at another end 18 thereof to third pulling means 20, in which such first, second and third pulling means 9, 14, 20 are connected to pulling means 22 of the airfoils 3, 5.

In particular, the first, second and third pulling means 9, 14, 20 are composed of cables or tie-rods.

The enclosed Figures show some possible applications of the helikite 1.

Figure 2:
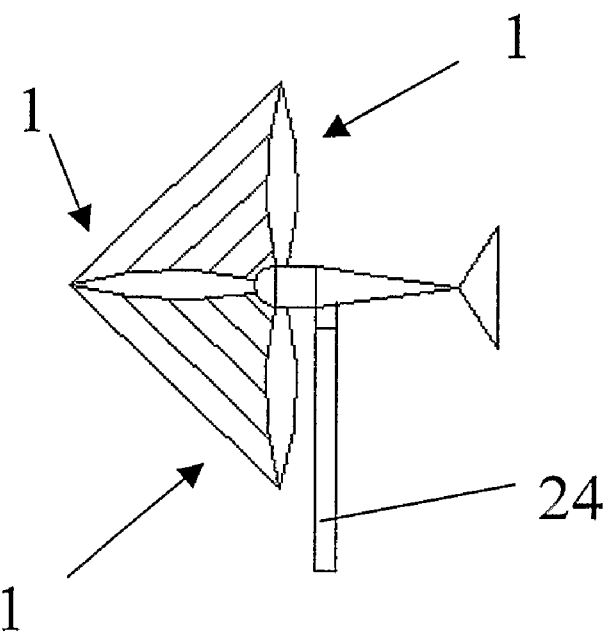
FIG. 2 shows an aeolian tower with a helikite which replaces the traditional propeller.

FIG. 2 shows, for example, a helikite 1 rotating on a fixed support. The application of a helikite 1 to an aeolian tower can replace a traditional propeller and rotate an alternator generating electrical energy.

The helikite 1 will have to be equipped with rigid ribs, which allow transmitting the rotation torque to an alternator.

Figure 3:
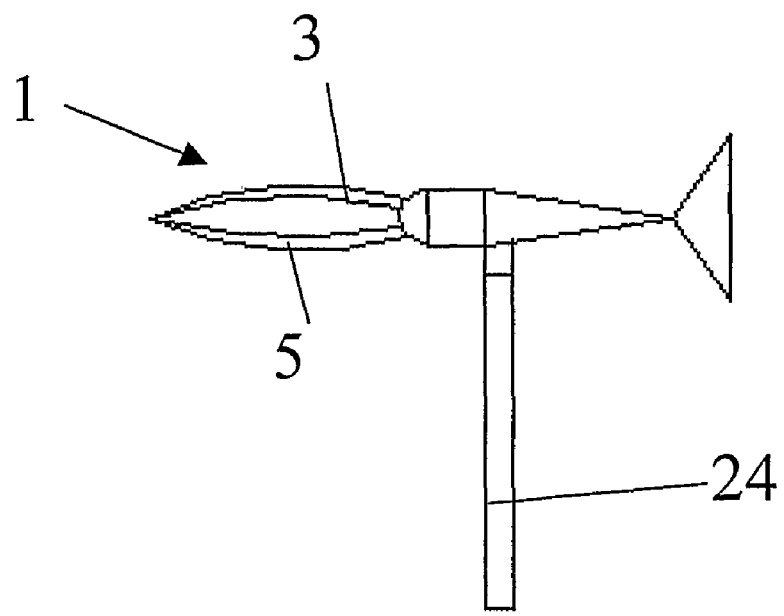
FIG. 3 shows the possibility of changing the kite profile through tie-rods till the complete kite bending.

The check of aerodynamic airfoils 3, 5 of the helikite 1, in case of wind increase, can be given both by the elastic deformability of the airfoils 3, 5 themselves, and by the shape check, obtained by constraint cables 9, 14, 20 of the device 1 which allow, in addition to controlling its pitch, also its complete closure (FIG. 3).

The thus composed device 1 appears much lighter and inexpensive with respect to the manufacture of aeolian generators equipped with rigid blades. In big windmills, the weight of the individual blades is tens of tons and the pitch check in addition to the airfoil modification, in case of wind blows, is slow and cumbersome.

Figure 4:
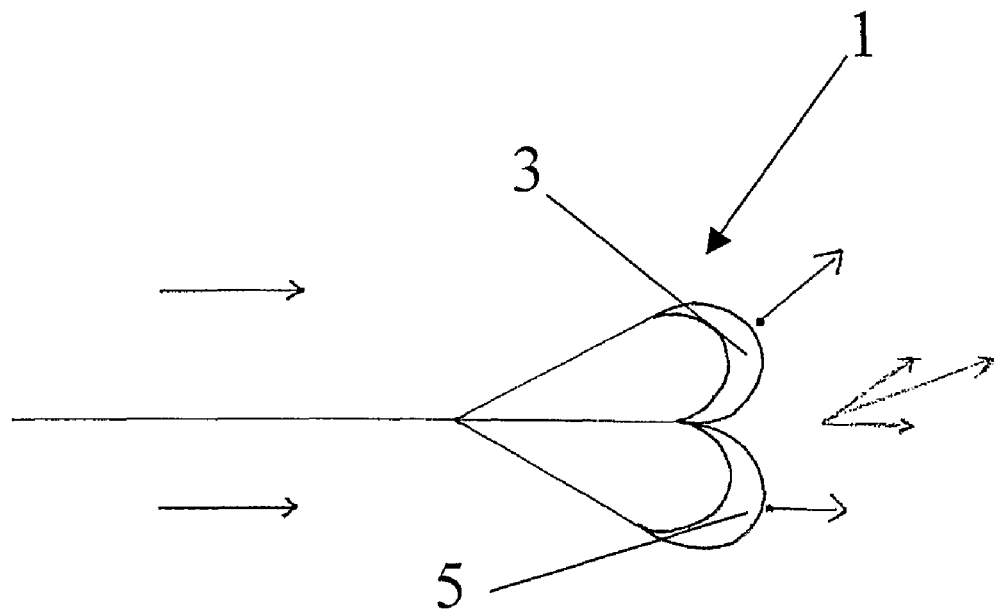
FIG. 4 shows the modification with a control cable of the kite profile in order to obtain differently oriented forces on the individual kite and a resulting force which allows the helikite to be placed with different angles with respect to the wind axis.

FIG. 4 instead shows the application of a helikite which, during its rotation, differently modifies the profile of the individual kites 3, 5.

By modifying the profile of the kites 3, 5 during their rotation, according to the same principles applied to helicopter blades, namely checking the shape of the individual kites 3, 5 according to their angular position when rotating, it is possible to obtain a resultant of the lift forces which is not aligned with the wind axis. By using the force of gravity as angular reference, helikites can be obtained which develop ascending forces, thus opposite forces to gravity, or also through a control cable 22, 23, real driving forms within a predefined angle with wind. A possible positioning angle is thus determined, exactly like in the case of the "possible" navigation area which distinguishes the sailing boats.

In the case of use of semi-rigid kites 3, 5, it will be enough to constrain the helikite 1 at a different point from the barycenter in order to obtain a lift resultant not aligned with the wind axis.

Having available a thus devised aerodynamic structure, a traction system and several systems for high aeolian generation become able to be realized.

Figure 5:
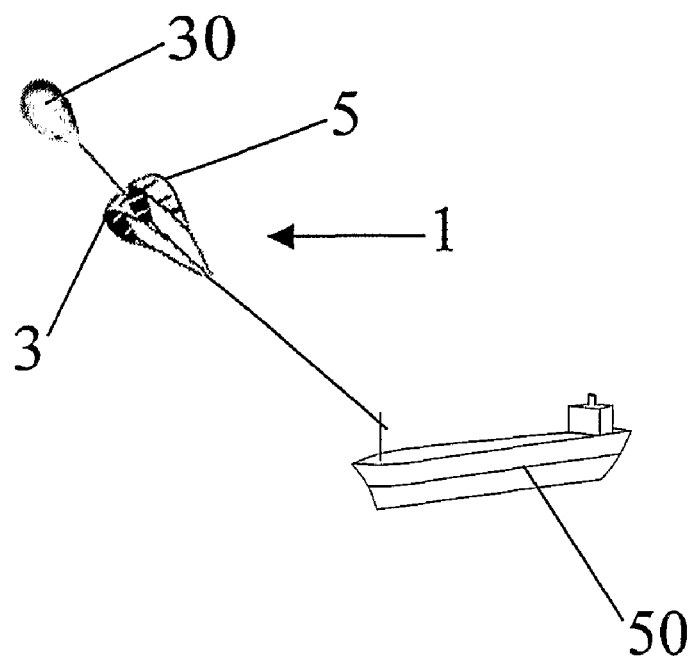
FIG. 5 shows a boat which uses a helikite as propulsor.

FIG. 5 shows the application of a helikite 1 for the traction of a boat 50.

Recently, some applications of traditional kites have been shown which operate as traction also for high tonnage ships 50; the application of a helikite 1 to this function optimizes the system aerodynamic efficiency, increasing with the same intercepted wind surface the traction exerted on a moving body.

It is further possible, by modifying the aerodynamic profile of the kites 3, 5 when rotating, to obtain the positioning of the helikite 1 not axial with the wind direction, but in a more favorable direction with respect to the route to be followed.

The use of a small aerostatic balloon 30 allows keeping the helikite 1 at a height also in the case of sudden wind drops, so as to avoid encumbrances at ground level.

With regard to energy generation through traction, the helikite 1, through a suitable orientation of the individual kites 3, 5 when rotating, produces an ascending force and a traction force on the constraining cables 22, 23.

Figure 6:
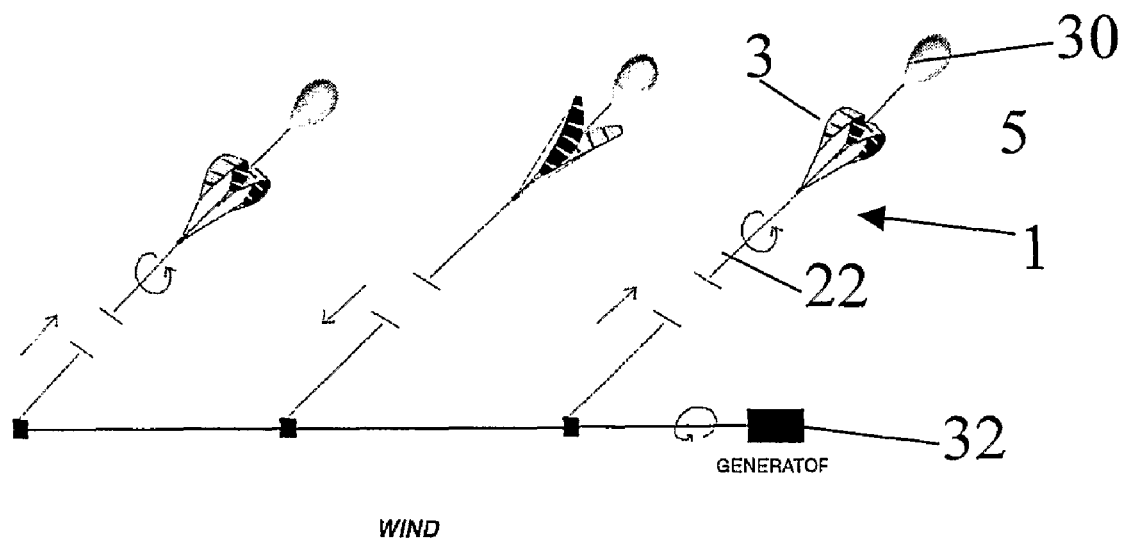
FIG. 6 shows a system of helikites which generate energy by traction.

The traction exerted on the constraining cables 22, 23 actuates, through a slow unwinding, a current generator 32 placed on the ground, as shown in FIG. 6.

The ascending movement of the helikite 1 will be alternated to recovery steps during which, by radically modifying the aerodynamic figure, it will be possible to recover the helikite 1 with a very small energy waste.

Having taken back the system at the desired height with a simple maneuver of one of the two constraining cables 22, 23, it will be possible to make the helikite 1 assume the open configuration and thus start a new traction cycle.

Figure 7:
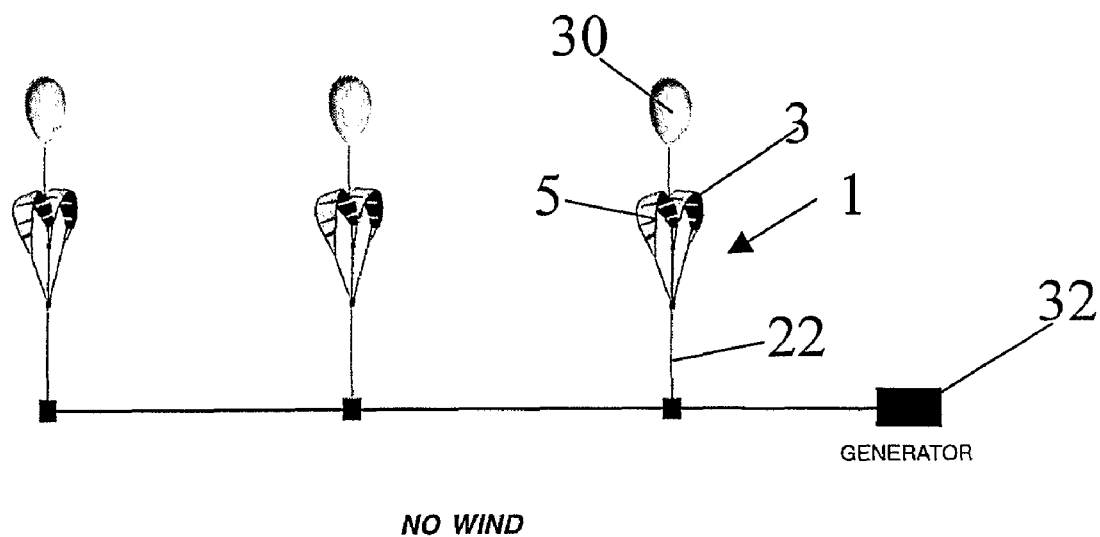
FIG. 7 shows the system with no wind.

The ascending force of the balloon can be computed for compensating the weight of the helikite and constraining cables 22, 23, in order to define the parking height, as can be seen in FIG. 7.

With regard instead to the energy generation by rotation, always by using the described configuration which creates an ascending force or also using the aerostatic balloon 30 which keeps the system at a height, it will be possible to choose an energy generation by exploiting the rotation that the helikite 1, equipped with rigid ribs, can impress to a generator 36 placed at a height.

Such arrangement had already been devised with other designs which however provide for the use of rigid blades; the weight of a system which uses rigid blades creates enormous limits, and perhaps an impossible realization.

The new-generation generators 36 are characterized by a core of permanent magnets and allow high weight reductions, in addition to the production of energy at very high voltages and that can be easily transferred also with cables with a small section.

Figure 8:
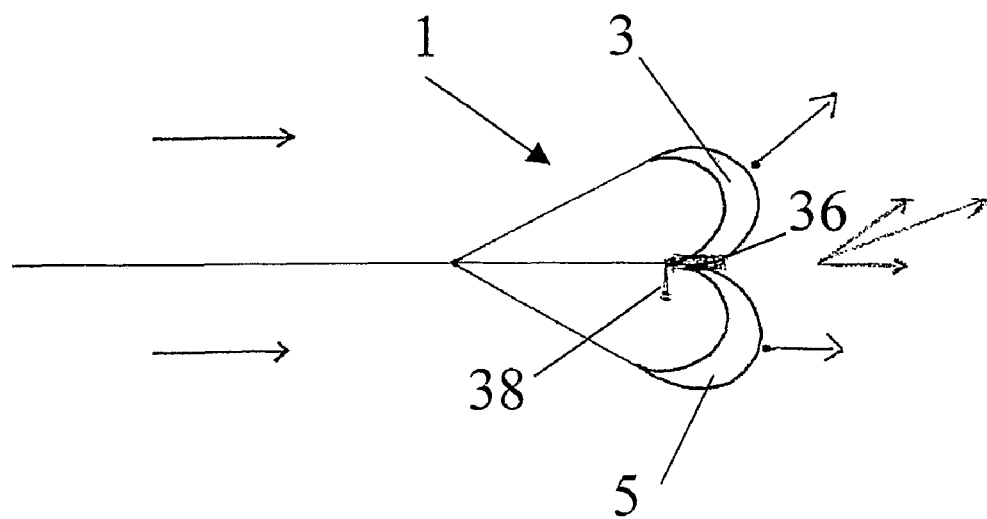
FIG. 8 shows helikites with generator placed in the rotating center, pointing out the necessary weight to obtain a resisting torque.

The alternator can be placed at the helikite 1 center, while, in order to counteract the rotation torque linked to energy production, a resisting torque will be necessary that can be easily obtained with weights 38 which are rigidly spaced from the rotation center of the generator 36, as can be seen in FIG. 8.

Figure 9:
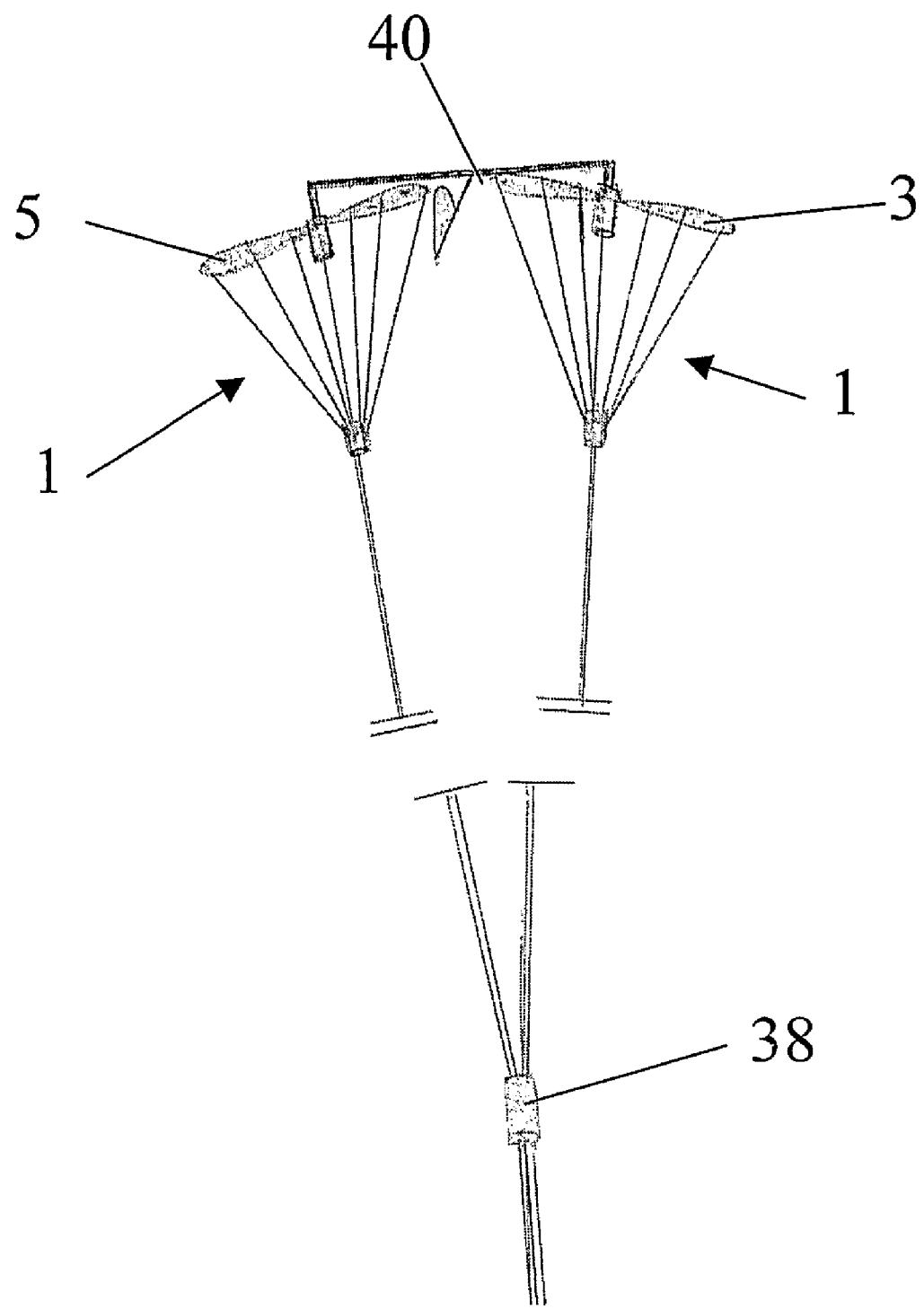
FIG. 9 shows a system of counter-rotating helikites constrained to a rigid support.

For a system with higher power, to avoid problems deriving from the rotation torque, it is possible to imagine many helikites, counter-rotating on the same axis with interposed generator or suitably spaced and secured to a rigid structure 40, which also supports the alternators, as can be seen in FIG. 9.

Also in this case, in order to take the structure back to ground, it will be possible to proceed by modifying the aerodynamic figure of the kites 3, 5 with a second constraining cable 23 in order to facilitate the system recovery.

The use of an auxiliary aerostatic balloon 30 can allow keeping the system at a height even when there is no wind.

The problems due to the presence of helikites at a height which can be a danger for other airplanes can be easily solved with the creation of aeolian parks, signaled on GPS navigation maps, where flight over them is forbidden.

The chance of operating with the helikite from any type of floating support also allows positioning it in deep sea waters, removing every environmental impact issue.

What is claimed is:

1. A device for generating energy, the device comprising:
   at least two ultralight rotating airfoils; and
   pulling means connected to the airfoils for keeping an aerodynamic shape of the airfoils when using the airfoils, the airfoils being mutually connected and adapted to be rotated around their common axis through a force applied by wind, so as to emulate a propeller performance,
   wherein the device is adapted, during rotation, to modify each of the airfoils independently by controlling a shape of each of the airfoils depending on its angular position when rotating, so as to obtain a resultant of lift forces not aligned with a wind axis, the device being adapted to be used both as traction system, and as aeolian generating system at a height, and
   the device is adapted to generate energy by rotation and to include rigid ribs adapted to transmit its movement to a generator placed at a center of the device, the device further including weights adapted to counteract a rotation torque linked to energy production, the weights being rigidly spaced from a rotation center of the generator to create a resisting torque that counteracts the rotation torque.

2. An apparatus comprising a plurality of the device of claim 1, wherein the devices are operatively connected together and counter-rotate on a same axis with the generator interposed.

3. An apparatus comprising a plurality of the device of claim 1, wherein the devices are operatively connected together, and are spaced and secured to a rigid structure which also supports the generator.

4. A device for generating energy, the device comprising:
   at least two sets of airfoils, each of the sets of airfoils comprising:
   at least two ultralight rotating airfoils, the airfoils being connected to pulling means for keeping an aerodynamic shape of the airfoils when using the airfoils, the airfoils being mutually connected and adapted to be rotated around their common axis through a force applied by wind, so as to emulate a propeller performance, wherein the sets of airfoils are operatively connected together and counter-rotate on a same axis with an interposed generator.

5. The device of claim 4, wherein the sets of airfoils are spaced and secured to a rigid structure that also supports the generator.

6. The device of claim 5, wherein the device is adapted to generate energy by rotation and to include rigid ribs adapted to transmit its movement to the generator, the device further including weights adapted to counteract a rotation torque linked to energy production, the weights being rigidly spaced from a rotation center of the generator to create a resisting torque that counteracts the rotation torque.

7. The device of claim 5, wherein the device is operatively connected to a fixed support and rotates the generator to generate electric energy, the device including rigid ribs adapted to allow transmitting a rotation torque to the generator and being adapted, through a shape controlling cable, to completely change the profile of the device.

8. The device of claim 5, further comprising a small aerostatic balloon adapted to keep the device at a when there is no wind.

9. The device of claim 4, wherein in each of the sets of airfoils, a first airfoil is connected at one end to first pulling means and at another end to second pulling means, a second airfoil is connected at one end to the second pulling means and at another end to third pulling means, the first, second, and third pulling means being connected to a pulling means for that set of airfoils for controlling an aerodynamic shape of the airfoils of the set.

10. The device of claim 4, wherein the device is operatively connected to a fixed support and rotates the generator to generate electric energy, the device including rigid ribs adapted to allow transmitting a rotation torque to the generator and being adapted, through a shape controlling cable, to completely change the profile of the device.

11. The device of claim 4, wherein, during rotation, each of the airfoils is modified independently by controlling a shape of each of the airfoils depending on its angular position when rotating, so as to obtain a resultant of lift forces not aligned with a wind axis.

12. The device of claim 4, wherein the device is adapted, by modifying the airfoils when rotating, to produce an ascending force and a traction force on constraining cables adapted to actuate, through a slow unwinding, the generator.

13. The device of claim 12, wherein the generator is located on the ground.

14. The device of claim 4, wherein the device is adapted to generate energy by rotation and to include rigid ribs adapted to transmit its movement to the generator, the device further including weights adapted to counteract a rotation torque linked to energy production, the weights being rigidly spaced from a rotation center of the generator to create a resisting torque that counteracts the rotation torque.

15. A device comprising:
at least one generator;
weights;
a first set of at least two ultralight rotating airfoils; and
first pulling means connected to the first set of airfoils for keeping an aerodynamic shape of these airfoils when using these airfoils, these airfoils being mutually connected and adapted to be rotated around their common axis through a force applied by wind, wherein the device is adapted to generate energy by rotation and to include rigid ribs adapted to transmit its movement to the generator, and the weights are adapted to counteract a rotation torque linked to energy production, the weights being rigidly spaced from a rotation center of the generator to create a resisting torque that counteracts the rotation torque.

16. The device of claim 15, wherein, during rotation, each of the airfoils is modified independently by controlling a shape of each of the airfoils depending on its angular position when rotating, so as to obtain a resultant of lift forces not aligned with a wind axis.

17. The device of claim 15, wherein the device is adapted to be used as an aeolian generating system at a height.

18. The device of claim 17, wherein the device is also adapted to be used as a traction system.

19. The device of claim 15, further comprising:
a second set of at least two ultralight rotating airfoils; and
second pulling means connected to the second set of airfoils for keeping an aerodynamic shape of these airfoils when using these airfoils, these airfoils being mutually connected and rotated around their common axis through a force applied by wind, wherein the first and second sets of airfoils are operatively connected together and counter-rotate on a same axis with the generator interposed.

20. The apparatus of claim 19, wherein the first and second sets of airfoils are spaced and secured to a rigid structure which also supports the generator.

21. The apparatus of claim 19, wherein the generator is placed at a center of the device.

22. The device of claim 15, further comprising:
a second set of at least two ultralight rotating airfoils; and
second pulling means connected to the second set of airfoils for keeping an aerodynamic shape of these airfoils when using these airfoils, these airfoils being mutually connected and rotated around their common axis through a force applied by wind, wherein the first and second sets of airfoils are operatively connected together, and are spaced and secured to a rigid structure which also supports the generator.

23. The device of claim 15, further comprising:
a second set of at least two ultralight rotating airfoils; and
second pulling means connected to the second set of airfoils for keeping an aerodynamic shape of these airfoils when using these airfoils, these airfoils being mutually connected and rotated around their common axis through a force applied by wind, wherein the at least one generator comprises first and second generators, the first and second sets of airfoils are operatively connected together, and are spaced and secured to a rigid structure, and the rigid structure supports the first and second generators.

24. The apparatus of claim 23, wherein the first generator is placed at a center of the first set of airfoils, and the second generator is placed at a center of the second set of airfoils.

* * * * *